United States Patent [19]

Iwasaki

[11] Patent Number: 5,304,905
[45] Date of Patent: Apr. 19, 1994

[54] MOTOR SERVO-SYSTEM CONTROLLER HAVING COMPARISON OF DETECTED CURRENT WITH MODEL CURRENT INTEGRATIONS

[75] Inventor: Takashi Iwasaki, Hyogo, Japan

[73] Assignee: Mitsubishi Denki Kabushiki Kaisha, Tokyo, Japan

[21] Appl. No.: 874,262

[22] Filed: Apr. 24, 1992

[30] Foreign Application Priority Data

Apr. 25, 1991 [JP] Japan .................................. 3-095126

[51] Int. Cl.$^5$ .......................................... G05B 13/04
[52] U.S. Cl. ................................. 318/561; 318/568.22; 318/616; 318/611; 364/151; 364/157
[58] Field of Search .................... 318/561, 568.22, 611, 318/615, 616, 619; 364/149, 150, 151, 157

[56] References Cited

U.S. PATENT DOCUMENTS

| 4,219,765 | 8/1980 | Morsing | 315/561 |
|---|---|---|---|
| 4,575,776 | 3/1986 | Stephens et al. | 318/561 X |
| 4,603,284 | 7/1986 | Perzley | 318/568 |
| 4,609,855 | 9/1986 | Andrews . | |
| 4,733,149 | 3/1988 | Culberson | 318/561 |
| 4,751,443 | 6/1988 | Jackson et al. | 318/580 |
| 4,792,737 | 12/1988 | Goff et al. | 318/615 |
| 4,839,573 | 6/1989 | Wise . | |
| 4,862,054 | 8/1989 | Schauder | 318/800 |
| 5,049,796 | 9/1991 | Seraji | 318/568.1 |
| 5,155,422 | 10/1992 | Sidman et al. | 318/560 |
| 5,159,254 | 10/1992 | Teshima | 318/611 |
| 5,160,876 | 11/1992 | Niinai et al. . | |

OTHER PUBLICATIONS

Technical Manual by Oppelt, Small Handbook of Technical Control Procedures, 5th Ed. 1972, pp. 514, 515.
Z-Electrical Engineering 64, vol. 23, Dec. 1982 pp. 16-18.

Primary Examiner—William M. Shoop, Jr.
Assistant Examiner—Brian Sircus
Attorney, Agent, or Firm—Townsend and Townsend Khourie and Crew

[57] ABSTRACT

To set the magnitude of the inertia of a motor and mechanical system or set gains suitable for the magnitude of vibrations of the motor and the mechanical system, the magnitude of a load inertia is identified in accordance with the time-integrated value of motor current to determine the gains of a feedback control loop in accordance with the identified value before executing feedback control in accordance with the determined gains.

6 Claims, 6 Drawing Sheets

MOTOR SERVO-SYSTEM CONTROLLER HAVING COMPARISON OF DETECTED CURRENT WITH MODEL CURRENT INTEGRATIONS

BACKGROUND OF THE INVENTION

1. Field of the Invention

The present invention relates to a motor servo-system controller for driving a mechanical system, particularly to a controller having an auto-tuning function for automatically setting control gains.

2. Description of the Prior Art

FIG. 6 is a block diagram showing an example of the motor servo-system controller inserted in "From analog servo to digital servo" (Iwakane: Journal of Robotics Society of Japan, Vol. 7 No. 3, pp. 212-217, June 1989). In FIG. 6, numeral 1 is a motor, 2 is a mechanical system mounted on the motor 1. In this case, combination of the motor 1 and the mechanical system 2 is the control object. Numeral 3 is a position and speed detector for measuring the position and speed of the control objects 1 and 2, 4 is a current detector for measuring the current flowing through the motor 1, 5 is a current control section, 6 is a speed control section, 7 is a position control section, 11 is a position command value, 12 is a detected position value, 13 is a detected speed value, 14 is a detected current value, 15 is a position error, 16 is a speed command value, 17 is a speed error, 18 is a current command value, 19 is a current error, 20 is the current flowing through the motor 1, and 30$d$ is a motor servo-system controller.

The following is the description of the operations. The motor servo-system controller 3$d$ is used to control the trajectory of, for example, a machine tool or robot, in which the position command value 11 is generated from a desirable trajectory command value to operate the control objects 1 and 2 in accordance with the position command value 11. That is, the difference between the detected position value 12 detected by the detector 3 and the position command value 11 is calculated to obtain the position error 15 and a proper operation is executed in the position control section 7 to determine the speed command value 16.

Then, the difference between the detected speed value 13 obtained by the detector 3 and the speed command value 16 is calculated to obtain the speed error 17 and a proper operation is executed in the speed control section 6 to determine the current command value 18. Moreover, the difference between the detected current value 14 obtained by the current detector 4 and the current command value 18 is calculated to obtain the current error 19 and a proper operation is executed in the current control section 6 to determine the motor current 20.

For the above existing controller; P (proportional) operation and PI (proportional and integral) operation are executed in the position control section 7, speed control section 6, and current control section 5 respectively. Therefore, preferable trajectory control can be realized by constituting the motor servo-system controller 30$d$ as the above mentioned and using proper gains corresponding to the control objects 1 and 2 for the operations by the control sections 5 through 7.

PROBLEM TO BE SOLVED BY THE INVENTION

The existing motor servo-system controller is constituted as the above mentioned. Therefore, when the mechanical system 2 is mounted for the first time or the characteristic of the mechanical system 2 is changed due to aged deterioration, a person in charge of adjustment must reset the gains in accordance with the magnitude of inertia and that of vibration of the mechanical system so far.

The present invention is made to solve the above problem and it is an object of this invention to provide a motor servo-system controller capable of automatically setting gains suitable for the magnitude of inertia or that of vibration of a motor and mechanical system.

SUMMARY OF THE INVENTION

Means for Solving the Object, Problem, and Function

The motor servo-system controller of the present invention comprises identification means for identifying the magnitude of the load inertia of a control object in accordance with the time-integrated value of the current flowing through the motor, gain determination means for determining the gains of a feedback control loop in accordance with the identified value, mechanical vibration judgment section for detecting the magnitude of mechanical vibration when operating the control object to judge whether or not the magnitude of vibration is kept within the allowable range, and gain revision means for revising the gains in accordance with the above judgment result.

The above and other objects, features, and advantages of the present invention will become more apparent from the following description when taken in conjunction with the accompanying drawings.

DESCRIPTION OF THE PREFERRED EMBODIMENT

Embodiments

Figure 1:
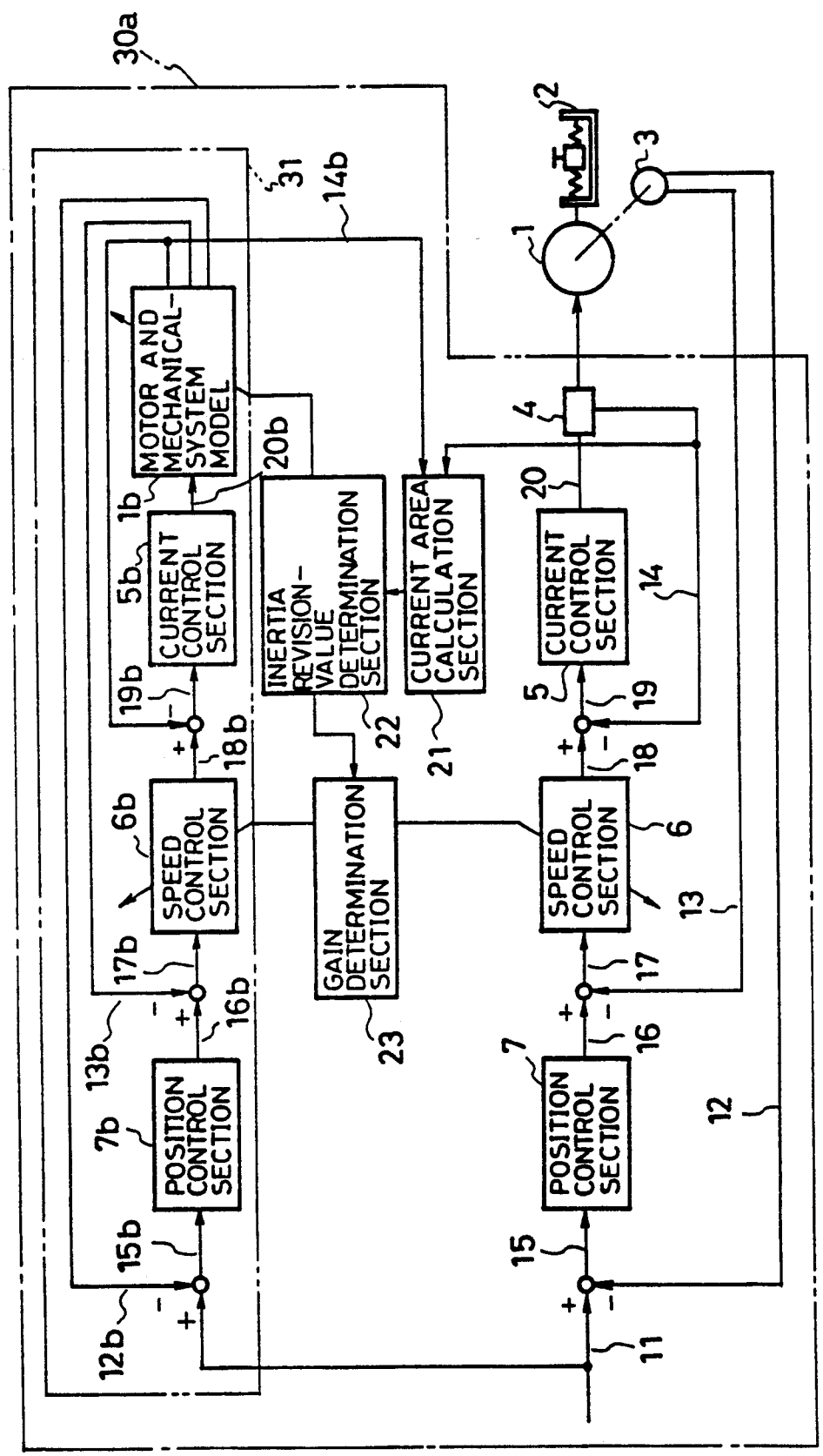
FIG. 1 shows a block diagram of the first embodiment of the present invention.

Embodiments of the present invention are described below by referring to drawings. FIG. 1 shows a block diagram of the motor servo-system controller according to the first embodiment. In FIG. 1, numeral 30$a$ is a motor servo-system controller with the auto-tuning function and 31 is a simulation section of the servo system. The simulation section 31 is constituted as shown below. That is, numeral 1$b$ is a motor and mechanical-system model in simulation, 5$b$ is a current control section in simulation, 6$b$ is a speed control section in simulation, 7b is a position control section in simulation, 12b is a detected position value in simulation, 13b is a detected speed value in simulation, 14b is a detected current value in simulation, 15b is a position error in simulation, 16b is a speed command value in simulation, 17b is a speed error in simulation, 18b is a current command value in simulation, 19b is a current error in simulation, and 20b is the motor current in simulation.

Numeral 21 is a current area calculation section as time integral means for calculating and comparing the current area of the actually detected current value 14 and that of the detected current value 14b in simulation, 22 is an inertia revision value determination section as inertia identification means for determining the revision value of the assumed inertia value of the motor and mechanical-system model 1b in accordance with the calculation result of the current area calculation section 21, and 23 is a gain determination section as gain adjustment means for determining the gains of the speed control sections 6 and 6b most suitable for the revised assumed inertia value.

The operations of the embodiment are described below. The operations of actual servo systems 1 through 7 and 11 through 20 are the same as those of the existing ones. When it is assumed that the characteristics of the motor 1 and detectors 3 and 4 are known but only the characteristic of the mechanical system 2 is unknown, all parameters in the current loop can be known and the gains of the current control section 5 can previously be determined by these parameters. When a plurality of motors are simultaneously operated like a machine tool, the gains of the position control section 7 use predetermined values because it is necessary to equalize the response frequencies of the position loop. Therefore, only the proportional gain and integral gain of the speed control section 6 are automatically adjusted for this embodiment. It is possible to realize automatic setting of the gains of the position control section 7 in accordance with the response frequency of the speed loop through simple extension of this embodiment.

For the simulation section of servo system, the current control section 5b, speed control section 6b, and position control section 7b are the same as the current control section 5, speed control section 6, and position control section 7 of the actual servo system. The motor and mechanical-system model is made by modeling the control objects 1 and 2 and the detectors 3 and 4. For this model, the mechanical system 2 is assumed as a simple inertia without considering mechanical vibrations. As previously described, because the characteristic parameters of the motor 1 and detectors 3 and 4 are known, only the magnitude of the inertia of the motor 1 and the mechanical system 2 is an unknown parameter. The assumed value of the inertia is assumed as J.

For this embodiment, the detected current values 14 and 14b obtained by applying the same position command value 11 to an actual servo system and the simulation section 31 of the servo system are compared and the assumed inertia value J is revised in accordance with the comparison result to finally obtain the fixed value of inertia and the speed loop gain most suitable for the fixed value.

Figure 2:
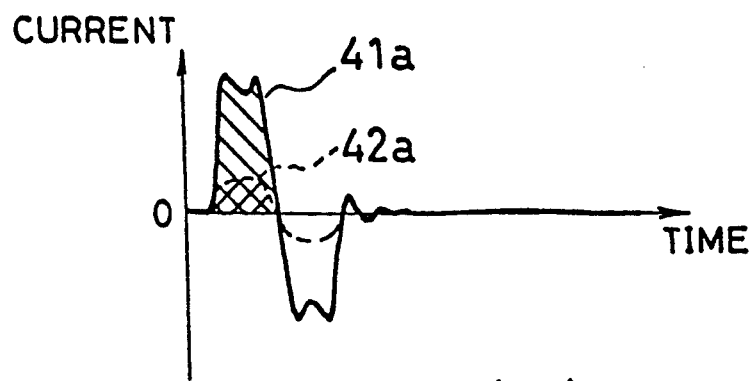
FIG. 2$a$–$c$ show current signal waveform diagrams during gain adjustment by the first embodiment of the present invention.
Figure 2:
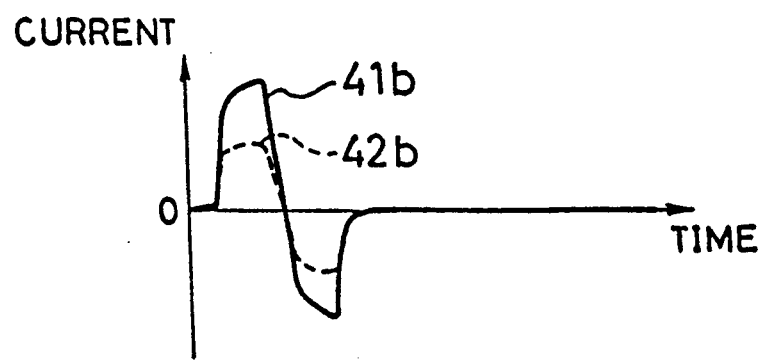
Figure 2:
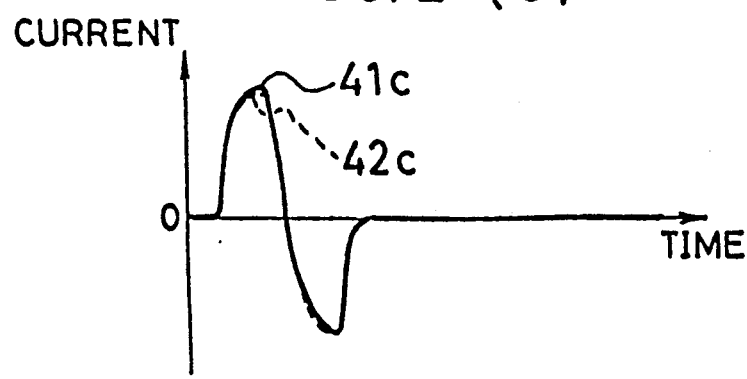

FIG. 2 shows examples of the current signal during auto-tuning. In FIG. 2, (a) shows the first-time current signal, (b) shows the second-time one, and (c) shows the third-time one. Numerals 41a through 41c are the time-series data of the current signal 14 of an actual servo system and numerals 42a through 42c are the time-series data of the current signal 14b of the servosystem simulation section 31. The tuning procedure is described below by referring to FIG. 2.

First, the initial value of the assumed inertia value J is determined. FIG. 2(a) shows the data for the detected current value obtained by applying the same position command value 11 to an actual servo system and the simulation section 31 of the servo system under the initial value of the assumed inertia value J. The current area calculation section 21 calculates the time-integrated value of the current at the first crest by using the time-series data 41a of the detected current value 14 of the actual servo system and the time-series data 42a of the detected current value 14b of the simulation section 31. The calculated value corresponds to the shaded area in FIG. 2(a). The inertia revision-value determination section 22 compares two areas obtained by the current area calculation section 21 and revises the assumed inertia value J of the motor and mechanical-system model 1b in accordance with the above comparison result. The revision value is determined through fuzzy inference. The gain determination section 23 determines the gains of the speed control sections 6 and 6b most suitable for the revised assumed inertia value J. Determination of the gain most suitable for the assumed inertia value J is possible because the characteristics of the control objects 1 and 2 and other control systems are known.

FIG. 2(b) shows the data for the detected current value obtained by applying the same position command value 11 to the actual servo system and the simulation section 31 again under the assumed inertia value J revised in accordance with the data in FIG. 2(a). As the result of obtaining two areas again by the current area calculation section 21 by using the data in FIG. 2 (b), it is found that the difference between the two areas is smaller than the difference between the areas in FIG. 2(a). This is because the assumed inertia value J comes closer to the actual inertia value as the result of revision. The inertial revision-value determination section 22 revises the assumed inertia value J in accordance with the area obtained by the current area calculation section 21 and determines the gains of the speed control sections 6 and 6b most suitable for the assumed inertia value J revised by the gain determination section 23.

FIG. 2(c) shows the data for the detected current value obtained by applying the same position command value 11 to the actual servo system and the simulation section 31 again under the assumed inertia value revised in accordance with the data in FIG. 2(b) and the gains of the speed control sections 6 and 6b. As the result of obtaining two areas by the current area calculation section 21 in accordance with the data in FIG. 2(c), it is found that there is little difference between the two areas. Therefore, tuning is completed because it is judged that the assumed inertia value J almost coincides with the actual inertia value. The gains of the speed control sections 6 and 6b used for the data in FIG. 2 (c) are the most suitable for the actual inertia value and inertia identification and tuning are completed at the same time.

Because this embodiment makes it possible to obtain the inertia values of the control objects 1 and 2 as the result of gain tuning, it can also be used, for example, to restrict the acceleration of the position command value 11. Also because the data based on simulation and actual data are compared, a controller with the general-purse auto-tuning function capable of corresponding to patterns of various position command values 11 can be obtained.

For the above embodiment, the current area calculation section 21 uses the detected current values 14 and 14b. However, it is also possible to use signals obtained by passing the detected current values 14 and 14b through a low-pass filter in order to eliminate high frequency noises such as mechanical vibrations or use the current command values 18 and 18b by assuming that the response of the current loop is quick enough. Also for this embodiment, the time-integrated value at the first crest is used as the current area to be obtained by the current area calculation section 21. However, it is also possible to use a value indicating the difference between an actual servo system and a servo system based on simulation like the time integration of the absolute values of current values of a plurality of crests or time integration of square values of current values. In addition, the revision value of the assumed inertia value J is obtained from the difference between current areas through fuzzy inference by the inertia revision-value determination section 22. However, any other method can be used as long as it can relate these factors.

Figure 3:
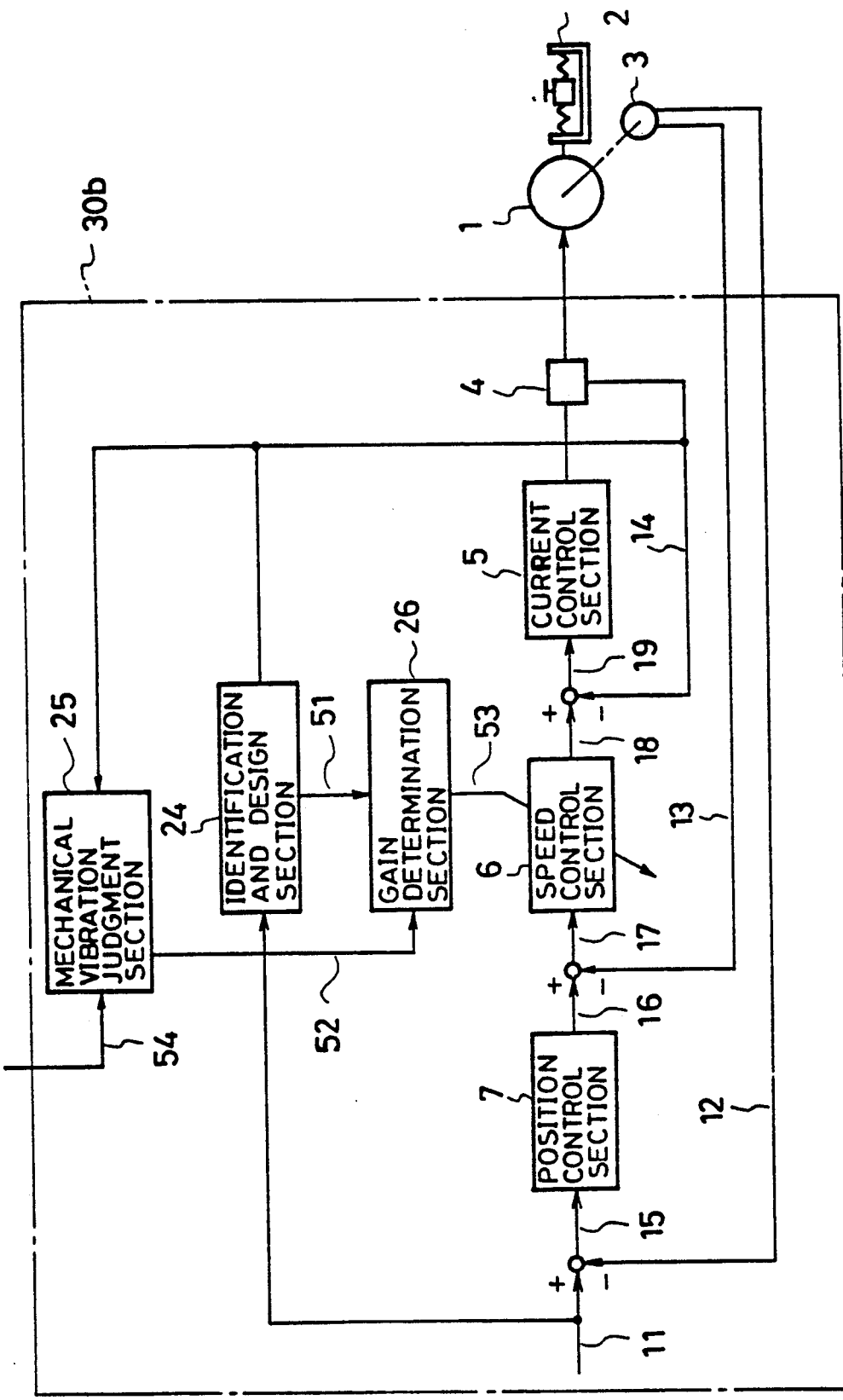
FIG. 3 shows a block diagram of the second embodiment of the present invention.

FIG. 3 shows the second embodiment of the present invention. In FIG. 3, numeral 30b is a motor servo-system controller with the auto-tuning function considering mechanical vibrations, 24 is an identification and design section, 25 is a mechanical vibration judgment section, 52 is a gain limit value due to mechanical vibrations obtained by the mechanical vibration judgment section 25, 53 is a gain determined by the gain determination section 26, and 54 is a vibration limit value. Other sections are the same as those described above.

The operations of the second embodiment are described below. The identification and design section 24 includes the current area calculation section 21, inertia revision-value determination section 22, gain determination section 23, and servo-system simulation section 31, which revises an assumed inertia value in accordance with the current data for the position command value 11 of a pattern before determining a preliminary gain value 51 most suitable for the assumed value. The mechanical vibration judgment section 25 obtains a vibration evaluation value by passing the current data for the position command value 11 same as the above through a high-pass filter and time-integrating the square value of the data and compare the time-integrated value with the previously-set vibration limit value 54. The mechanical vibration judgment section 25 also holds the maximum speed-loop proportional gain $K_{VOK}$ whose vibration evaluation value is equal to or less than the vibration limit value 54 and the minimum speed-loop proportional gain $K_{Vng}$ whose vibration evaluation value is equal to or more than the vibration limit value 54 among the speed-loop proportional gains attempted for the same position command value 11 in the past.

Thus, $K_{VOK}$ and $K_{Vng}$ are revised by the speed-loop proportional gain and vibration evaluation value due to the attempt of this time according to necessity. That is, $K_{Vng}$ equals the speed-loop proportional gain of this time if the vibration evaluation value of this time is larger than the vibration limit value, but $K_{VOK}$ equals the speed-loop proportional gain of this time if the vibration evaluation value of this time is smaller than the vibration limit value. The gain limit value 52 which is the output of the mechanical vibration judgment section 25 is determined by the following expression.

$$\text{Gain limit value} = \sqrt{K_{Vng} \times K_{VOK}} \quad \text{[Expression 1]}$$

The gain determination section 26 compares the proportional gain of the preliminary gain value 51 obtained by the identification and design section 24 with the gain limit value 52 obtained by the mechanical vibration judgement section 25, and determines the preliminary gain value 51 as the gain 53 used for the speed control section G if the gain limit value 52 is larger than the proportional gain. However, if the gain limit value is smaller than the proportional gain, the gain determination section 26 determines the proportional gain of the gain 53 used for the speed control section 6 as the gain limit value 52 and the integral gain as the value suitable for the proportional gain.

Figure 4:
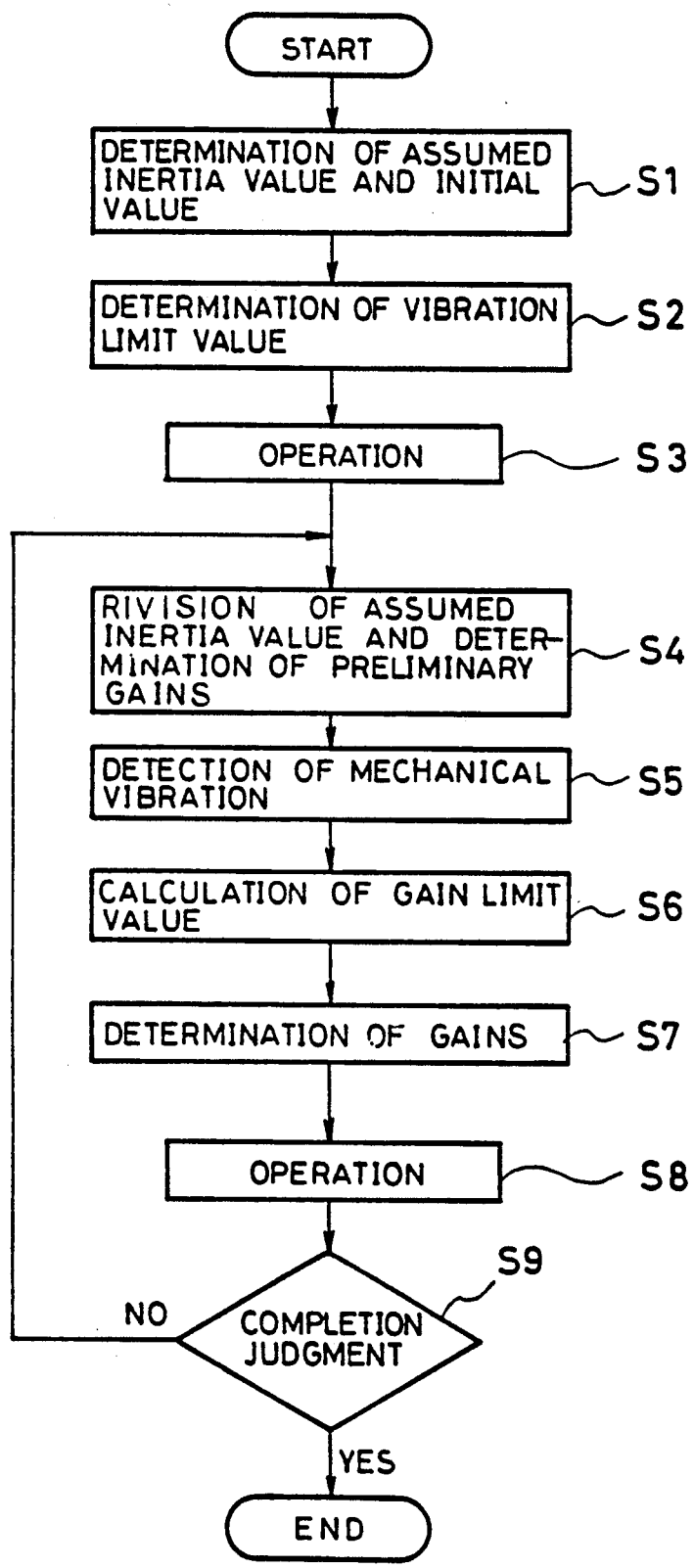
FIG. 4 shows a flow chart for the operation of the second embodiment of the present invention.

The above procedure is described below by referring to the flow chart in FIG. 4. In Step S1, the initial value of the assumed inertia value J is determined and a gain most suitable for the initial value is determined. In Step S2, the vibration limit value 54 is determined. In Step S3, the control objects 1 and 2 are operated. Then, in Step S4, the assumed inertia value J is revised and the preliminary gain value 51 is determined by the identification and design section 25. In Step S5, a mechanical vibration evaluation value is calculated by the mechanical vibration judgment section 25. In Step S6, the gain control value 52 is obtained.

In Step S7, the gain 53 used for the speed control section 6 is determined by the preliminary gain value 51 and gain limit value 52. In Step S8, the control object 1 is operated by the gain 53. In Step S9, it is checked by the data for operation based on a new gain if identification of inertia is completed and the result of gain limitation due to vibration limitation meets the condition for completion before tuning is completed. Unless the condition for completion is met, Steps S4 through S8 are repeated in accordance with the operation data in Step S8.

For the second embodiment, the identification and design section 24 has the same constitution as that in FIG. 1. However, any other constitution is allowed as long as it has the same function. Also for this embodiment, the evaluation value for mechanical vibrations is obtained from the current data by the mechanical vibration judgement section 25. However, it is also possible to obtain the vibration evaluation value from a value based on the data capable of measuring the magnitude of mechanical vibrations such as the signal sent from an accelerometer or speed detector mounted on the mechanical system 2. Moreover, the second embodiment can easily be combined with a mechanical vibration controller such as a notch filter.

Figure 5A:
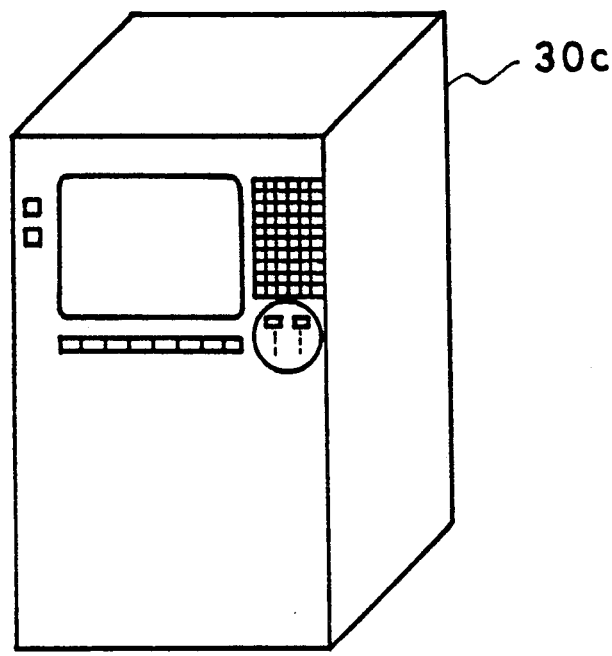
FIG. 5 (A) shows an perspective view of the third embodiment of the present invention and FIG. 5 (B) shows an enlarged view of the portion (a) in FIG. 5 (A)
Figure 5B:
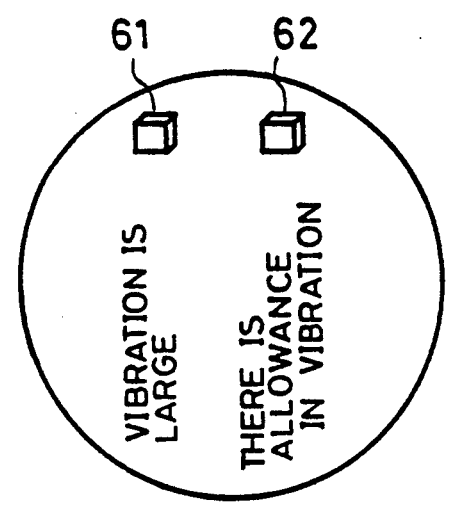
Figure 6:
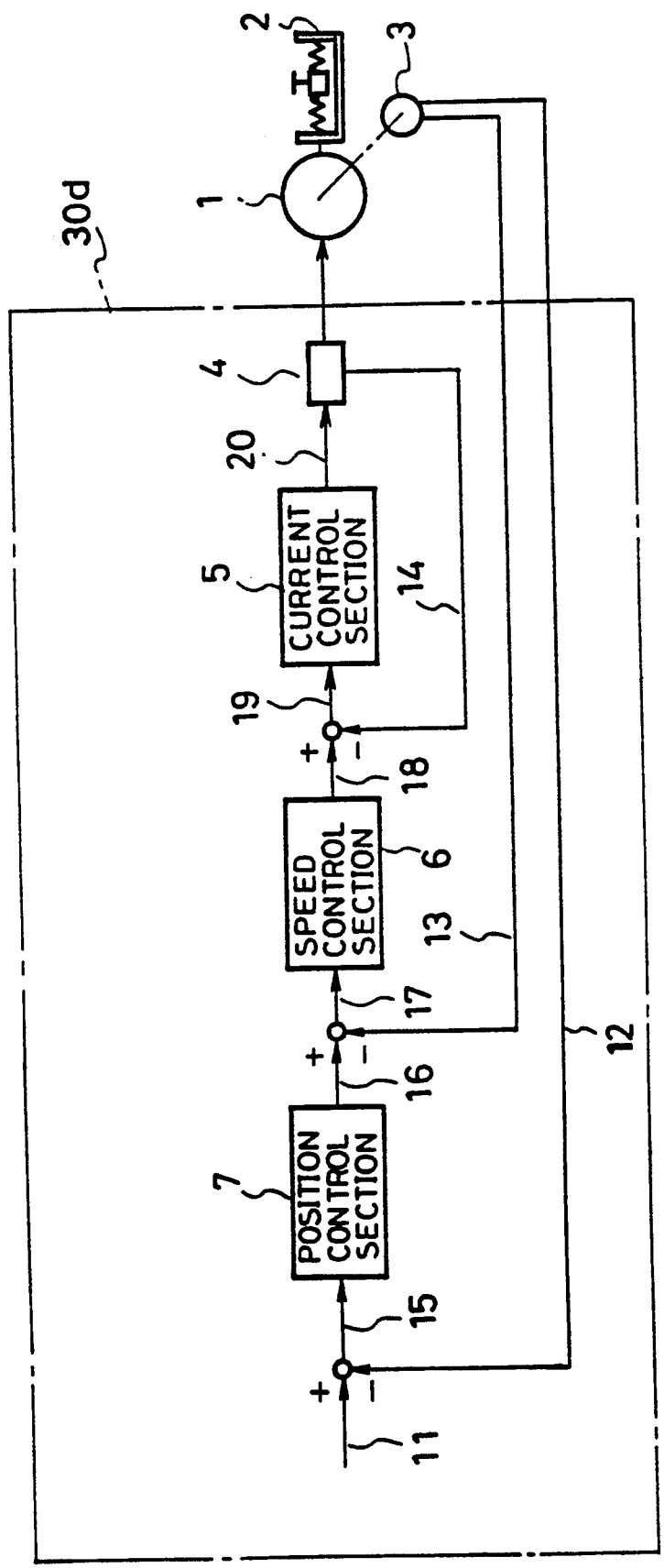
FIG. 6 shows a block diagram of an existing controller.

FIG. 5 shows the third embodiment of the present invention. In FIG. 5, numeral 30c is a motor servo-system controller with the auto-tuning function capable of changing the vibration limit value, 61 is a push button mounted on the controller and to be pressed for excessive mechanical vibration, and 62 is a push button to be pressed for very small mechanical vibration with an allowance.

The operations of the third embodiment are described below. For the controller 30b shown in FIG. 3, proper tuning is executed in accordance with the preset vibration limit value 54. However, the allowable range of mechanical vibrations depends on the conditions such as the accuracy requested to a machine tool or robot. Therefore, the controller 30c of this embodiment is designed so that the vibration limit value 54 can be changed. The push button 61 to be pressed for excessive mechanical vibration is pressed when the operator judges vibration to be excessive in the operations of the control objects 1 and 2 after tuning by a certain vibration limit value 54 is completed. By pressing the push button 61, the vibration limit value 54 decreases by 70%. By executing auto-tuning agains after pressing the push button 61, gains with less mechanical vibration can be obtained. The push button 62 to be pressed for very small mechanical vibration with an allowance has the function to increase the vibration limit value 54 to 130%. The push buttons 61 and 62 constitute the adjustment means for adjusting the allowable range of vibrations of the vibration judgment section 25.

For the above third embodiment, the rate of the vibration limit value to be changed by pressing the push buttons 61 and 62 is set to ±30%. However, it is possible to set the rate to a different value depending on the specification or input the change rate in the form of a numerical value. The same effect can be obtained by displaying the present vibration evaluation value on the controller 30c and inputting the vibration limit value 54 in the form of a numerical value in accordance with the above evaluation value.

Advantage of the Invention

As described above, the present invention provides a motor servo-system controller capable of automatically adjusting the gains to the optimum value, decreasing the load of the person in charge of adjustment, and easily realizing the optimum operation because the magnitude of load inertia is identified in accordance with the time-integrated value of motor current and the gains of the feedback control loop are adjusted by the identified value.

Moreover, the present invention provides a motor servo-system controller capable of corresponding to mechanical vibrations because the gains obtained as described above are revised in accordance with the magnitude of mechanical vibrations.

What is claimed is:

1. A motor servo-system controller for feedback-controlling a control object consisting of a motor and a mechanical system mounted on the motor, comprising:
 a first current control means coupled to said motor, a first speed control means coupled to said current control means and a first position control means coupled to said speed control means;
 current detection means, coupled to said motor, for detecting the current flowing through the motor;
 a servo-system simulation means comprising a motor and mechanical system model having at least a first adjustable parameter, for outputting a model current value, a second current control means, coupled to said motor and mechanical system model, substantially identical to said first current control means, a second speed control means, coupled to said second current control means, substantially identical to said first speed control means and a second position control means, coupled to said second speed control means, substantially identical to said first position control means;
 time integral means, coupled to said current detection means and said servo-system simulation means for time-integrating the detected current value and the model current value;
 identification means, coupled to said time integral means, for identifying the magnitude of the load inertia of the control object in accordance with the time-integrated value by comparing the time-integrated value of the detected current with the time-integrated value of the model current;
 means, coupled to said motor and mechanical system model, for adjusting said first adjustable parameter in said motor and mechanical system model until it is determined that said time-integrated value of the detected current is within a predetermined difference from said time-integrated value of the model current; and
 gain adjustment means for adjusting the gains in the feedback control loop and in the servo-system simulation in accordance with the identified value.

2. A motor servo-system controller for feedback-controlling a control object consisting of a motor and a mechanical system mounted on the motor, comprising:
 a first current control means coupled to said motor, a first speed control means coupled to said current control means and a first position control means coupled to said speed control means;
 current detection means, coupled to said motor, for detecting the current flowing through the motor;
 a servo-system simulation means comprising a motor and mechanical system model for outputting a model current value, a second current control means, coupled to said motor and mechanical system model, substantially identical to said first current control means, a second speed control means, coupled to said second current control means, substantially identical to said first speed control lmeans and a second position control means, coupled to said second speed control means, substantially identical to said first position control means;
 time integral means, coupled to said current detection means and said servo-system simulation means, for time-integrating the detected current value and a model current value
 identification means, coupled to said time integral means, for identifying the magnitude of the load inertia of the control object in accordance with the time-integrated value by comparing the time-integrated value of the detected current with the time-integrated value of a model current;
 gain adjustment means for adjusting the gains in the feedback control loop and in the servo-system simulation in accordance with the identified value;
 wherein said identification means determines the inertia by revising an assumed value which is previously assumed so that the detected current value of the load in an actual servo system is within a predetermined difference from the detected current value of the load in the simulation section for the same position command value.

3. A motor servo-system controller for feedback-controlling a control object consisting of a motor and a mechanical system mounted on the motor, comprising:
 a first current control means coupled to said motor, a first speed control means coupled to said current control means and a first position control means coupled to said speed control means;

current detection means, coupled to said motor, for detecting the current flowing through the motor;

a servo-system simulation means comprising a motor and mechanical system model having at least a first adjustable parameter, for outputting a model current value, a second current control means, coupled to said motor and mechanical system model, substantially identical to said first current control means, a second speed control means, coupled to said second current control means, substantially identical to said first speed control means and a second position control means, coupled to said second speed control means, substantially identical to said first position control means;

time integral means, coupled to said current detection means and said servo-system simulation means for time-integrating the detected current value and the model current value;

identification means, coupled to said time integral means, for identifying the magnitude of the load inertia of the control object in accordance with the time-integrated value by comparing the time-integrated value of the detected current with the time-integrated value of the model current;

means, coupled to said motor and mechanical system model, for adjusting said first adjustable parameter in said motor and mechanical system model until it is determined that said time-integrated value of the detected current is within a predetermined difference from said time-integrated value of the model current;

gain determination means for determining the gains in the feedback control loop in accordance with the identified value;

a mechanical vibration judgment section for detecting the magnitude of mechanical vibrations caused by the operation of a control object and judging whether or not the magnitude of mechanical vibrations is kept within the allowable range; and gain revision means for revising said gains in the feedback control loop and the servo-system simulation in accordance with judgement result by the mechanical vibration judgment section.

4. A motor servo-system controller for feedback-controlling a control object consisting of a motor and a mechanical system mounted on the motor, comprising:

a first current control means coupled to said motor, a first speed control means coupled to said current control means and a first position control means coupled to said speed control means;

current detection means, coupled to said motor, for detecting the current flowing through the motor;

a servo-system simulation means comprising a motor and mechanical system model for outputting a model current value, a second current control means, coupled to said motor and mechanical system model, substantially identical to said first current control means, a second speed control means, coupled to said second current control means, substantially identical to said first speed control means and a second position control means, coupled to said second speed control means, substantially identical to said first position control means;

time integral means, coupled to said current detection means and said servo-system simulation means, for time-integrating the detected current value and the model current value;

identification means, coupled to said time integral means, for identifying the magnitude of the load inertia of the control object in accordance with the time-integrated value by comparing the time-integrated value of the detected current with the time-integrated value of the model current;

gain determination means for determining the gains in the feedback control loop in accordance with the identified value;

a mechanical vibration judgment section for detecting the magnitude of mechanical vibrations caused by the operation of a control object and judging whether or not the magnitude of mechanical vibrations is kept within the allowable range;

gain revision means for revising said gains in the feedback control loop and the servo-system simulation in accordance with the judgement result by the mechanical vibration judgement section;

wherein said identification means determines the inertia by revising an assumed value which is previously assumed so that the detected current value of the load in an actual servo system is within a predetermined difference from the detected current value of the load in the simulation section for the same position command value.

5. A motor servo-system controller for feedback-controlling a control object consisting of a motor and a mechanical system mounted on the motor, comprising:

a first current control means coupled to said motor, a first speed control means coupled to said current control means and a first position control means coupled to said speed control means;

current detection means, coupled to said motor, for detecting the current flowing through the motor;

a servo-system simulation means comprising a motor and mechanical system model, having at least a first adjustable parameter for outputting a model current value, a second current control means, coupled to said motor and mechanical system model, substantially identical to said first current control means, a second speed control means, coupled to said second current control means, substantially identical to said first speed control means and a second position control means, coupled to said second speed control means, substantially identical to said first position control means;

time integral means, coupled to said current detection means and said servo-system simulation means for time-integrating the detected current value and the model current value;

identification means, coupled to said time integral means, for identifying the magnitude of the load inertia of the control object in accordance with the time-integrated value by comparing the time-integrated value of the detected current with the time-integrated value of the model current;

means, coupled to said motor and mechanical system model, for adjusting said first adjustable parameter in said motor and mechanical system model until it is determined that said time-integrated value of the detected current is within a predetermined difference from said time-integrated value of the model current;

gain determination means for determining the gains in the feedback control loop in accordance with the identified value;

a mechanical vibration judgment section for detecting the magnitude of mechanical vibrations caused by the operation of a control object and judging whether or not the magnitude of mechanical vibrations is kept within the allowable range;

gain revision means for revising said gains in the feedback control loop and the servo-system simulation in accordance with the judgment result by the mechanical vibration judgment section; and adjustment means for adjusting the allowable range in the mechanical vibration judgment section.

6. A motor servo-system controller according to claim 5, wherein:

said adjustment means consists of a push button for decreasing a vibration limit value within the allowable range and a push button for increasing the vibration limit value.

* * * * *